Patented Aug. 26, 1924.

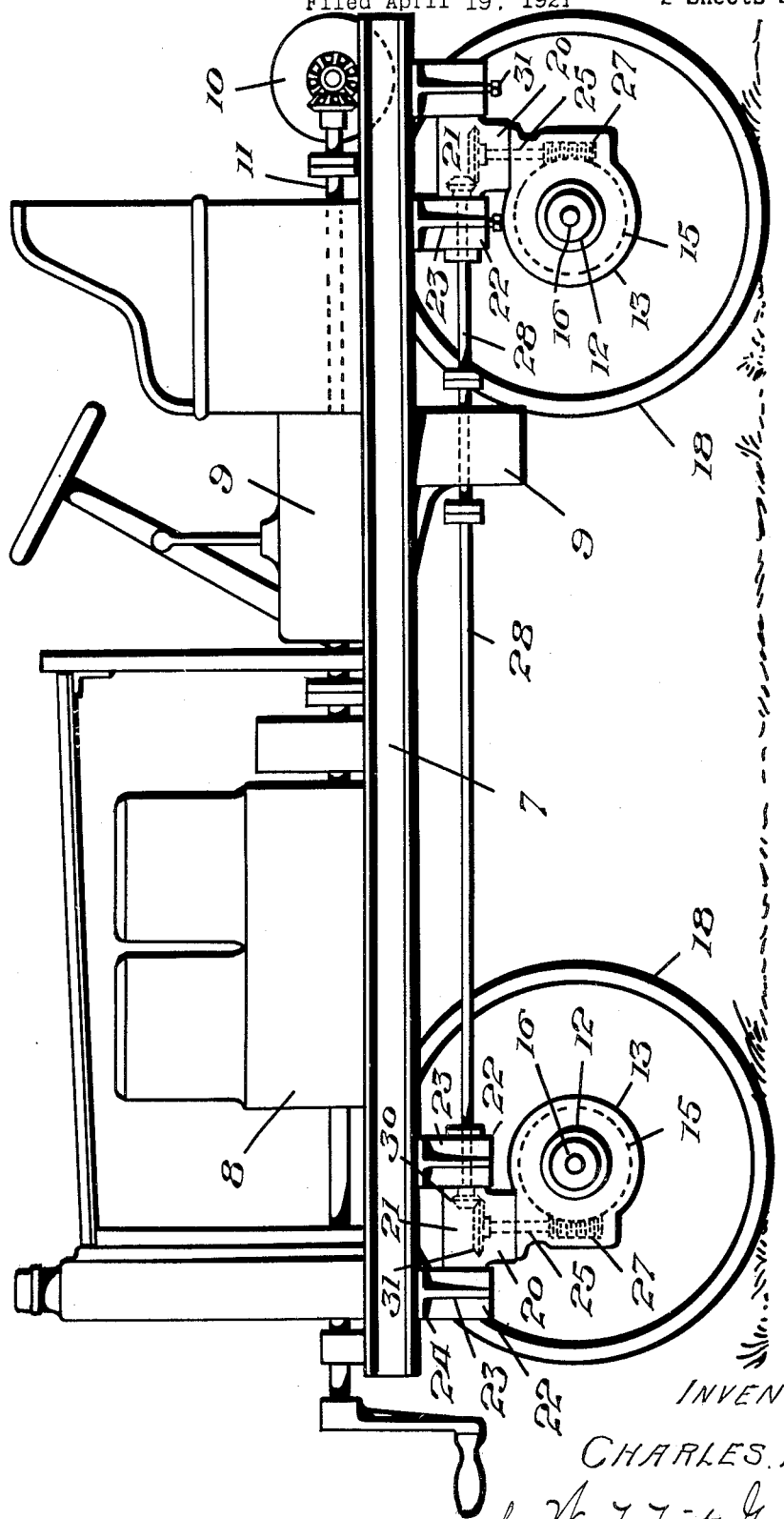

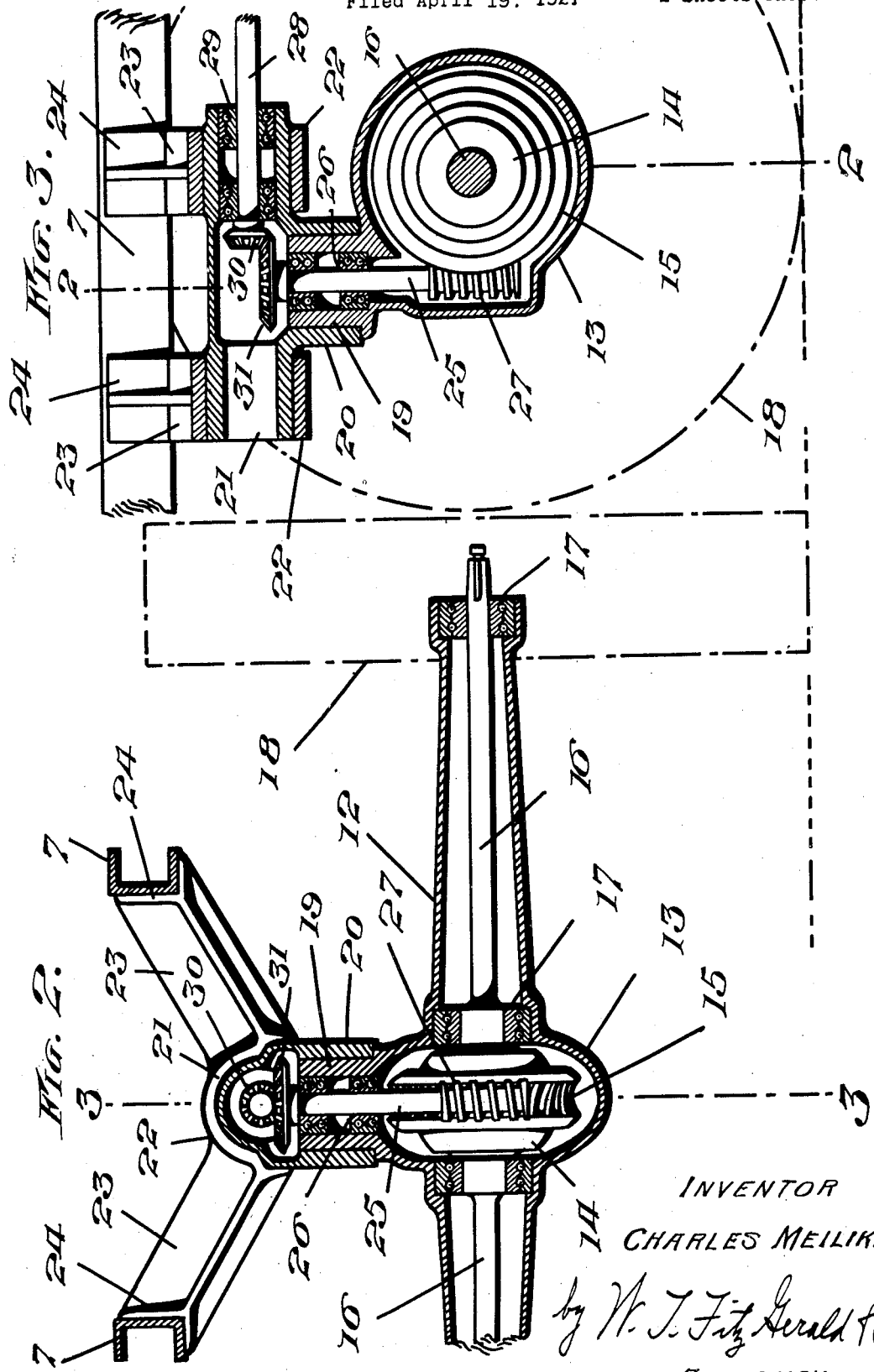

1,506,653

UNITED STATES PATENT OFFICE.

CHARLES MEILIKE, OF CLINTONVILLE, WISCONSIN.

FOUR-WHEEL DRIVE AND STEERING TRACTOR.

Application filed April 19, 1921. Serial No. 462,561.

*To all whom it may concern:*

Be it known that I, CHARLES MEILIKE, a citizen of the United States, residing at Clintonville, in the county of Waupaca and State of Wisconsin, have invented certain new and useful Improvements in Four-Wheel Drive and Steering Tractors; and I do hereby declare the following to be a full, clear, and exact description of the invention, such as will enable others skilled in the art to which it appertains to make and use the same.

The present invention relates to the running gear of tractors and other motor vehicles, and aims to provide a novel and improved construction whereby both the front and rear wheels can be driven and also angled for purpose of steering, to provide for the efficient propelling of the vehicle and to enable same to turn short corners.

Another object of the invention is the provision of a novel and improved flexible connection between the axle of each pair of wheels and the frame, to permit the axle to swing about a vertical axis for purpose of steering, and to also oscillate, if desired, about a horizontal axis extending longitudinally of the machine, with the driving means located within such flexible connection for transmitting power to the wheels.

A further object is the provision of such an axle construction comprising a novel assemblage of the component elements, in order to provide a practical and efficient device for the intended purposes, and which device will be comparatively simple.

With the foregoing and other objects in view, which will be apparent as the description proceeds, the invention resides in the construction and arrangement of parts hereinafter described and claimed, it being understood that changes can be made within the scope of what is claimed without departing from the spirit of the invention.

The invention is illustrated in the accompanying drawings, wherein:—

Figure 1 is a side elevation of a tractor showing the improvements embodied therein, the near wheels being removed.

Fig. 2 is a section on the line 2—2 of Fig. 3.

Fig. 3 is a section on the line 3—3 of Fig. 2.

The chassis of the tractor or motor vehicle comprises a suitable frame having the longitudinal side beams 7, and the frame carries a suitable engine 8 and a transmission mechanism 9. In order that the tractor can be used as a power plant, a pulley wheel 10 is preferably mounted on the frame, such as at the rear end, and is operatively connected, as at 11, with the mechanism 9. A belt can be thus operated by the pulley 10 for driving an electrical generator, or other device or machine.

Each of the axles is substantially the same as the usual rear axle of automobiles and motor vehicles as well known, and includes the axle housing 12 having a casing 13 between its ends in which the usual differential gearing 14 is located, and said gearing has a worm wheel 15 thereon for driving it, as shown, and the axle shafts 16 extend from the gearing in opposite directions and are mounted for rotation with the housing 12, preferably by means of ball bearings 17. The wheels 18 are secured on the projecting terminals or spindles of the shafts 16.

In carrying out the invention, the differential casing 13 is formed with an offset upstanding hollow pivot stud 19 fitted for rotation about a substantially vertical axis within a bearing 20 depending from a horizontal yoke or member 21 between the ends of said member. The member or yoke 21 is tubular, as shown, and is disposed longitudinally of the machine, with its end portions journaled within a pair of bearings 22, to permit said member 21 and axle housing 12 to oscillate about a horizontal axis extending longitudinally of the machine. The bearings 22 have arms 23 diverging upwardly toward opposite sides and formed with angular seats 24 in which the beams 7 of the frame are fitted and secured, thereby supporting the frame from said bearings 22.

The drive mechanism for each axle includes a vertical shaft 25 journaled for rotation within the pivot stud 19, preferably by means of ball bearings 25, and having a worm 27 at its lower terminal meshing with the worm wheel 15. The shafts 28 extend from the transmission gearing 9 forwardly and rearwardly to the front and rear axle constructions, in alinement with the members 21, and said shafts enter said members axially thereof, and are journaled and mounted for rotation within the corresponding end portions of the members 21, preferably by means of ball bearings 29. On the end of each shaft 28 within each member 21 is secured a bevel gear 30 meshing with a bevel gear 21 secured on the upper end of the shaft 25, whereby the shaft 25 is driven from the shaft 28.

The member 21 of the front axle is loose within the bearings 22, so that the front axle can oscillate about an axis extending longitudinally of the machine in passing over uneven surfaces, but the member 21 of the rear axle is preferably secured rigidly within the bearings 22, such as by means of set screws 31, or the like, thereby providing a three-point suspension including the two rear wheels and the pivoted joint between the forward end portion of the frame and front axle construction.

Both axle housings 12 can oscillate about the vertical axes of the shafts 25 and pivot studs 19, and the axle housings can be angled by any suitable means (not shown). The front axle can also oscillate about the axis of the corresponding shaft 28 due to the turning movement of the member 21 in the bearings 22, and the power is transmitted to all four wheels, in all positions of the axles under the different conditions. Each axle construction also provides for the efficient support of the frame from the axle, the frame beams 7 being carried by the arms 23 of the bearings 22, supported by the members 21 which are in turn fitted on and supported from the studs 19 of the axle housings 12.

Having thus described the invention, what is claimed as new is:

A device of the character described comprising a pair of substantially horizontal bearings spaced apart, a horizontal member having end portions fitted in said bearings and having a depending bearing between the firstnamed bearings, an axle housing below one of the firstnamed bearings, a differential gearing in said housing including a worm wheel rotatable about the axis of the housing, axle shafts extending from said gearing in opposite directions within said housing coaxial with said wheel, ground wheels secured on the opposite ends of said axle shafts coaxial with the axle shafts and housing, said housing being formed with an upstanding stud offset to one side of the axis of said housing and ground wheels and pivotally engaging said depending bearing, a substantially vertical shaft spaced to one side of said axis and journaled in said stud and having a worm meshing with said wheel at one side of the aforesaid axis, and a horizontal shaft entering one end portion of said member and geared to the upper end of said vertical shaft.

In testimony whereof I have signed my name to this specification in the presence of two subscribing witnesses.

CHARLES MEILIKE.

Witnesses:
JULIUS SPEARBRAKER,
LEVI A. LARSON.